(12) United States Patent
Imamura et al.

(10) Patent No.: US 9,505,399 B2
(45) Date of Patent: Nov. 29, 2016

(54) CONTROL DEVICE FOR VEHICLE

(71) Applicants: Tatsuya Imamura, Okazaki (JP); Tooru Matsubara, Toyota (JP); Kenta Kumazaki, Toyota (JP); Takeshi Kitahata, Toyota (JP); Yasuhiro Hiasa, Nagoya (JP); Atsushi Tabata, Okazaki (JP)

(72) Inventors: Tatsuya Imamura, Okazaki (JP); Tooru Matsubara, Toyota (JP); Kenta Kumazaki, Toyota (JP); Takeshi Kitahata, Toyota (JP); Yasuhiro Hiasa, Nagoya (JP); Atsushi Tabata, Okazaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/431,845

(22) PCT Filed: Nov. 27, 2013

(86) PCT No.: PCT/IB2013/002646
§ 371 (c)(1),
(2) Date: Mar. 27, 2015

(87) PCT Pub. No.: WO2014/087210
PCT Pub. Date: Jun. 12, 2014

(65) Prior Publication Data
US 2015/0246671 A1 Sep. 3, 2015

(30) Foreign Application Priority Data
Dec. 4, 2012 (JP) ................. 2012-265230

(51) Int. Cl.
*B60L 9/00* (2006.01)
*B60W 20/00* (2016.01)
(Continued)

(52) U.S. Cl.
CPC ............. *B60W 20/40* (2013.01); *B60K 6/445* (2013.01); *B60K 6/547* (2013.01); *B60W 10/06* (2013.01);
(Continued)

(58) Field of Classification Search
CPC ................... B60W 2540/10; B60W 2540/12; B60W 30/181; F16H 2306/52; F16H 63/502; B60T 2260/04; B60T 2201/02; C05G 3/0064; C05G 3/04
USPC .......................................................... 701/22
See application file for complete search history.

(56) References Cited

U.S. PATENT DOCUMENTS

2002/0006850 A1* 1/2002 Takao ................... B60K 31/04
477/118
2008/0132378 A1 6/2008 Bouchon
(Continued)

FOREIGN PATENT DOCUMENTS

JP 2008-265598 A 11/2008
JP 2009-298203 A 12/2009
(Continued)

OTHER PUBLICATIONS

U.S. Appl. No. 61/643,125, filed May 4, 2012, Gibson et al., Specification :pp. 1-68.*
(Continued)

*Primary Examiner* — Muhammad Shafi
(74) *Attorney, Agent, or Firm* — Andrews Kurth Kenyon LLP

(57) ABSTRACT

A vehicle having mounted thereon a differential device including a sun gear, a ring gear and a carrier, a first motor generator coupled to the sun gear, a second motor generator coupled to the ring gear, an automatic transmission provided between the ring gear and a drive wheel, an engine coupled to the carrier, and a brake suppressing the rotation of the carrier. The vehicle has a traveling mode that is selected from a first mode in which traveling is performed by using a torque outputted from the first and second motor generators in a state where the brake is engaged, and a second mode in which the traveling is performed by operating the engine in a state where the brake is disengaged.

7 Claims, 9 Drawing Sheets

(51) Int. Cl.
 B60K 6/445 (2007.10)
 B60K 6/547 (2007.10)
 B60W 10/06 (2006.01)
 B60W 10/08 (2006.01)
 B60W 10/115 (2012.01)
 *B60K 6/38* (2007.10)

(52) U.S. Cl.
 CPC ............ B60W 10/08 (2013.01); B60W 10/115 (2013.01); B60W 20/00 (2013.01); B60W 20/30 (2013.01); *B60K 2006/381* (2013.01); *B60W 2710/105* (2013.01); *Y02T 10/6239* (2013.01); *Y02T 10/6286* (2013.01)

(56) References Cited

U.S. PATENT DOCUMENTS

2011/0118078 A1* 5/2011 Kraska .................... B60K 6/48
 477/5

2013/0023380 A1* 1/2013 Sah ........................ B60K 6/445
 477/5

FOREIGN PATENT DOCUMENTS

| JP | 2010-000858 A | | 1/2010 |
| JP | 2010-083361 | * | 4/2010 |
| JP | 2010-083361 A | | 4/2010 |
| JP | 2010083361 | * | 4/2010 |
| JP | 2010-149559 A | | 7/2010 |

OTHER PUBLICATIONS

U.S. Appl. No. 61/643,125, filed May 4, 2012, Gibson et al., Drawings 1-24.*
U.S. Appl. No. 61/643,125, filed May 4, 2012, Gibson et al., Cover.*

* cited by examiner

FIG. 3

|  | C1 | C2 | B1 | B2 | B3 |
|---|---|---|---|---|---|
| 1ST | ○ | × | × | × | ○ |
| 2ND | ○ | × | × | ○ | × |
| 3RD | ○ | × | ○ | × | × |
| 4TH | ○ | ○ | × | × | × |
| 5TH | ○ | ○ | × | × | × |
| R | × | ○ | × | × | ○ |
| N | × | × | × | × | × |

○ ENGAGED
× DISENGAGED

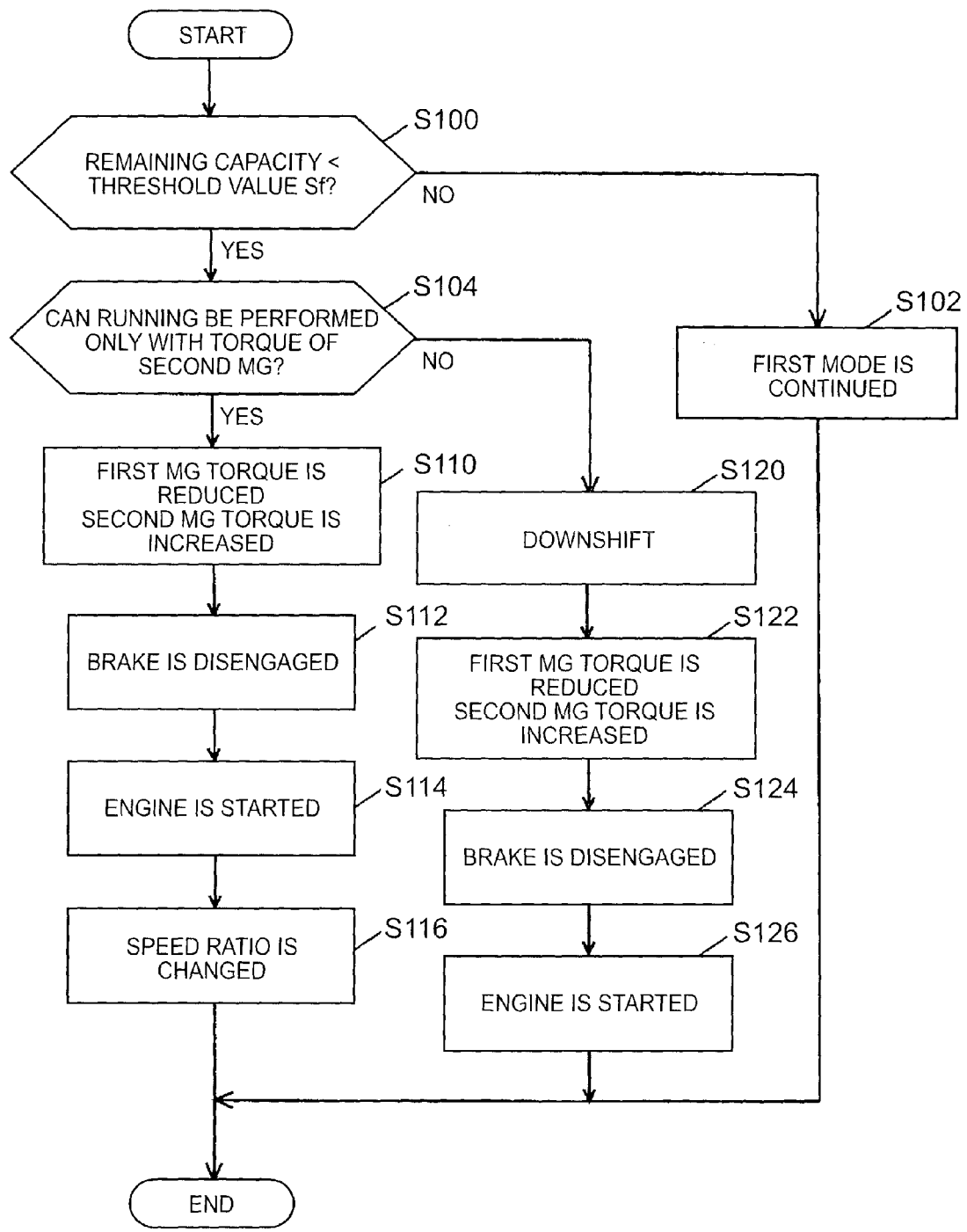

CONTROL DEVICE FOR VEHICLE

CROSS-REFERENCE TO RELATED APPLICATIONS

This is a national phase application based on the PCT International Patent Application No. PCT/IB2013/002646 filed on Nov. 27, 2013, claiming priority to Japanese Patent Application No. 2012-265230 filed Dec. 4, 2012, the entire Contents of both of which are incorporated herein by reference.

BACKGROUND OF THE INVENTION

1. Field of the Invention

The invention relates to a control device for a vehicle, and particularly relates to a technology for switching from a traveling mode in which an engine is stopped to a traveling mode in which the engine is operated in a vehicle on which an electric motor and the engine are mounted as drive sources.

2. Description of Related Art

A vehicle on which an engine and an electric motor are mounted as drive sources is commercially available. Such a vehicle is called a hybrid vehicle or an electric vehicle with a range extender.

As an example of the vehicle mentioned above, Japanese Patent Application Publication No. 2008-265598 (JP 2008-265598 A) discloses a vehicle capable of traveling using two motors with the operation of the engine stopped and a clutch, which fixes a crankshaft, brought into an ON state.

In the vehicle disclosed in JP 2008-265598 A, when the engine is started, the engine is cranked by using one of the two motors. As a result, a drive torque used for the traveling of the vehicle can be reduced when the engine is started.

SUMMARY OF THE INVENTION

The invention provides a control device for a vehicle that suppresses a change in drive torque when the traveling mode is switched.

An aspect of the invention relates to a control device for a vehicle. On the vehicle, there are mounted a differential device including a first rotary element, a second rotary element, and a third rotary element, a first electric motor coupled to the first rotary element, a second electric motor coupled to the second rotary element, a transmission provided between the second rotary element and a drive wheel, an engine coupled to the third rotary element, and an engagement element suppressing rotation of the third rotary element. The control device for the vehicle includes a controller. The controller is configured to switch a traveling mode of the vehicle from a first mode in which the vehicle travels by using a torque outputted from the first electric motor and a torque outputted from the second electric motor in a state where the engagement element is engaged, to a second mode in which the vehicle travels by operating the engine in a state where the engagement element is disengaged. The controller is configured to switch the traveling mode to the second mode after downshifting the transmission.

Since the transmission is downshifted before the switching of the traveling mode, it is possible to compensate for a reduction in drive torque that can be caused by the switching of the traveling mode with an increase in drive torque caused by the downshift. Consequently, it is possible to suppress a change in drive torque when the traveling mode is switched.

In the control device, the controller may be configured to switch the traveling mode to the second mode without downshifting the transmission in a case where a target drive torque of the vehicle is achievable only with the torque outputted from the second electric motor. With this, the downshift is omitted when the downshift is not required, and it is thereby possible to reduce a time required for the switching of the traveling mode.

In the control device, the controller may be configured to reduce the torque outputted from the first electric motor during the downshift. With this, it is possible to suppress a fluctuation in drive torque during the switching of the traveling mode.

In the control device, the controller may be configured to maintain an engagement force of the engagement element constant during the downshift. With this, it is possible to prevent a random fluctuation in drive torque during the downshift caused by the rotation of an output shaft of the engine.

In the control device, the controller may be configured to start the engine after the downshift is completed. With this, in a state where the drive torque can fluctuate due to the downshift, it is possible to avert a further random fluctuation in drive torque caused by the start of the engine.

In the control device, the controller may be configured to keep a speed ratio of the transmission unchanged while the engagement element is switched from the state where the engagement element is engaged to the state where the engagement element is disengaged. With this, in a state where the drive torque can change due to the disengagement of the engagement element, it is possible to prevent a further change in drive torque caused by gear shift.

In the control device, the controller may be configured to upshift the transmission after switching the traveling mode to the second mode. With this, it is possible to improve fuel efficiency by lowering the rotating speed of the engine and the like.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a view showing an operation table;

FIG. 9 is a flowchart showing a process executed by an ECU.

DETAILED DESCRIPTION OF EMBODIMENTS

Figure 1:
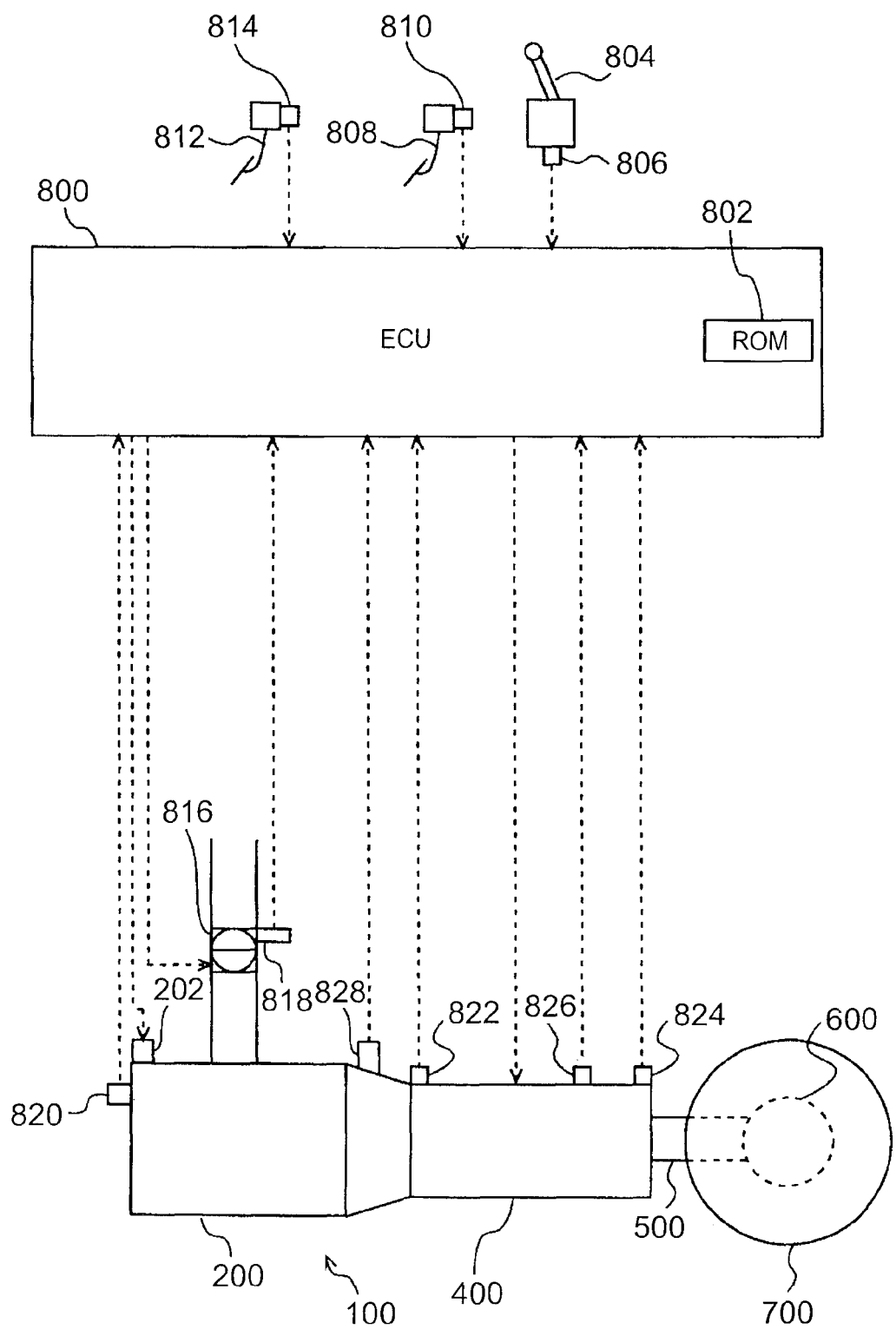
FIG. 1 is a, schematic structural view showing a hybrid vehicle.

Hereinbelow, a description will be given of an embodiment of the invention with reference to the drawings. In the following description, the same elements are designated by the same reference numerals, and the names and functions thereof are also the same. Accordingly, detailed descriptions thereof will not be repeated.

With reference to FIG. 1, a description will be given of a hybrid vehicle according to the embodiment of the invention. The hybrid vehicle is a front-engine rear-drive (FR) vehicle. Note that the vehicle may also be a vehicle other than the FR. The vehicle described as the hybrid vehicle in the present embodiment includes a plug-in hybrid vehicle capable of charging a battery using an external power source and an electric vehicle provided with a range extender in which an engine is used mainly for generating electric power.

The hybrid vehicle includes a hybrid system 100 as a drive source, an automatic transmission 400, a propeller shaft 500, a differential gear 600, rear wheels 700, and an electronic control unit (ECU) 800. A control device according to the present embodiment is implemented by executing, e.g., programs recorded in a read only memory (ROM) 802 of the ECU 800. The power train of the hybrid vehicle includes the hybrid system 100 and the automatic transmission 400.

An engine 200 of the hybrid system 100 is an internal combustion engine in which an air-fuel mixture of fuel injected from an injector 202 and air is combusted in a combustion chamber of a cylinder. A piston in the cylinder is pushed down by the combustion, and a crankshaft is thereby rotated.

The automatic transmission 400 is coupled to the output shaft of the hybrid system 100. A driving force outputted from the automatic transmission 400 is transmitted to the right and left rear wheels 700 via the propeller shaft 500 and the differential gear 600.

To the ECU 800, there are connected, via a harness and the like, a position switch 806 of a shift lever 804, an accelerator depression amount sensor 810 of an accelerator pedal 808, a depression force sensor 814 of a brake pedal 812, a throttle opening sensor 818 of an electronic throttle valve 816, an engine speed sensor 820, an input shaft speed sensor 822, an output shaft speed sensor 824, an oil temperature sensor 826, and a temperature sensor 828.

The position of the shift lever 804 is detected by the position switch 806, and a signal indicative of the detection result is transmitted to the ECU 800. In accordance with the position of the shift lever 804, gear shift in the automatic transmission 400 is automatically performed.

The accelerator depression amount sensor 810 detects the depression amount of the accelerator pedal 808, and transmits a signal indicative of the detection result to the ECU 800. The depression force sensor 814 detects the depression force of the brake pedal 812 (the force used by a driver for depressing the brake pedal 812), and transmits a signal indicative of the detection result to the ECU 800.

The throttle opening sensor 818 detects the opening of the electronic throttle valve 816 that is adjusted by an actuator, and transmits a signal indicative of the detection result to the ECU 800. The amount of air taken in the engine 200 (the output of the engine 200) is adjusted by the electronic throttle valve 816.

Note that the amount of air taken in the engine 200 may also be adjusted by changing the lift amount of an intake valve (not shown) or an exhaust valve (not shown) or changing an opening/closing phase instead of or in addition to the electronic throttle valve 816.

The engine speed sensor 820 detects the rotating speed of the output shaft (crankshaft) of the engine 200 (engine speed NE), and transmits a signal indicative of the detection result to the ECU 800. The input shaft speed sensor 822 detects the rotating speed NI of an input shaft of the automatic transmission 400, and transmits a signal indicative of the detection result to the ECU 800. The output shaft speed sensor 824 detects the rotating speed NO of an output shaft of the automatic transmission 400, and transmits a signal indicative of the detection result to the ECU 800.

The vehicle speed of the hybrid vehicle is calculated from the rotating speed NO of the output shaft of the automatic transmission 400. Note that, since conventional common technologies may be used for the method for calculating the vehicle speed, the detailed description thereof will not be repeated.

The oil temperature sensor 826 detects the temperature (oil temperature) of an oil (automatic transmission fluid (ATF)) used for the operation and lubrication of the automatic transmission 400, and transmits a signal indicative of the detection result to the ECU 800.

The temperature sensor 828 detects the temperature of a second motor generator 312 described later, and transmits a signal indicative of the detection result to the ECU 800.

The ECU 800 controls equipment such that the vehicle is brought into a desired traveling state based on the signals transmitted from the position switch 806, the accelerator depression amount sensor 810, the depression force sensor 814, the throttle opening sensor 818, the engine speed sensor 820, the input shaft speed sensor 822, the output shaft speed sensor 824, the oil temperature sensor 826, the temperature sensor 828, and the like, and maps and programs stored in the ROM 802.

Figure 2:
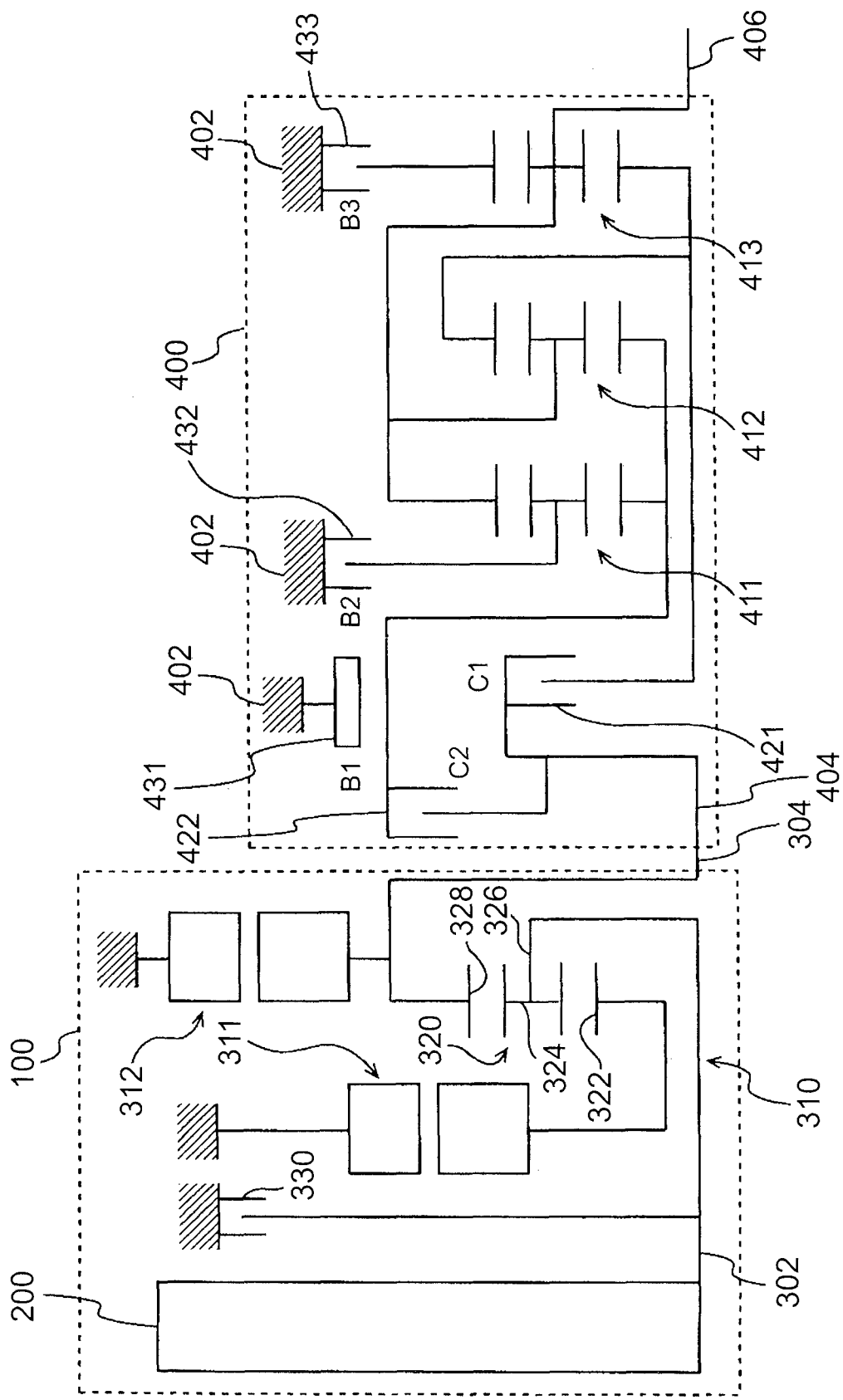
FIG. 2 is a view showing a hybrid system and an automatic transmission.

The hybrid system 100 and the automatic transmission 400 will be further described with reference to FIG. 2.

The hybrid system 100 includes the engine 200, a power dividing mechanism 310, a first motor generator 311, and the second motor generator 312. The power dividing mechanism 310 divides the output of the engine 200 inputted to an input shaft 302 into the portion for the first motor generator 311 and the portion for an output shaft 304. The power dividing mechanism 310 is constituted by a planetary gear 320.

The planetary gear 320 includes a sun gear 322, a pinion gear 324, a carrier 326 that supports the pinion gear 324 such that the pinion gear 324 can rotate and revolve, and a ring gear 328 that is engaged with the sun gear 322 via the pinion gear 324.

In the power dividing mechanism 310, the carrier 326 is coupled to the input shaft 302, i.e., the engine 200. The rotation of the carrier 326 can be suppressed by a brake, 330. That is, by engaging the brake 330, it is possible to reduce each of the rotating speed of the carrier 326 and the rotating speed of the output shaft of the engine 200 to zero. As an example, the brake 330 is caused to operate by supply of an oil pressure. The sun gear 322 is coupled to the first motor generator 311. The ring gear 328 is coupled to the output shaft 304.

The power dividing mechanism 310 functions as a differential device with the relative rotation of the sun gear 322, the carrier 326, and the ring gear 328. By the differential function of the power dividing mechanism 310, the output of the engine 200 is divided into the portion for the first motor generator 311 and the portion for the output shaft 304.

The first motor generator 311 generates electric power by using a part of the output of the engine 200 resulting from the division, the second motor generator 312 is rotationally driven by using the electric power generated by the first motor generator 311, and the power dividing mechanism 310 thereby functions as a continuously variable transmission.

Each of the first motor generator 311 and the second motor generator 312 is a three-phase alternating current (AC) dynamo-electric machine. The first motor generator 311 is coupled to the sun gear 322 of the power dividing mechanism 310. The second motor generator 312 is provided such that a rotor rotates integrally with the output shaft 304.

Electric power is supplied to the first motor generator 311 and the second motor generator 312 from a battery (not shown). The battery can be charged by driving the first motor generator 311 using the engine 200 to cause the first motor generator 311 to operate as a generator. In addition, during regenerative braking, the battery is charged with electric power generated by the second motor generator 312.

The engine 200, the first motor generator 311, and the second motor generator 312 are controlled such that the target drive torque of the vehicle calculated from, e.g., the accelerator depression amount and the vehicle speed is satisfied and the optimum fuel efficiency is implemented in the engine 200.

The automatic transmission 400 includes an input shaft 404 as an input rotary member and an output shaft 406 as an output rotary member that are provided on the same axis in a case 402 as a non-rotary member attached to a vehicle body.

The input shaft 404 is coupled to the output shaft 304 of the power dividing mechanism 310. Consequently, the rotating speed NI of the input shaft of the automatic transmission 400 is equal to the rotating speed of the output shaft of the power dividing mechanism 310, i.e., the rotating speed of the ring gear 328 (the rotating speed of the second motor generator 312) NR.

The automatic transmission 400 includes three single pinion type planetary gears 411 to 413 and five frictional engagement elements of a C1 clutch 421, a C2 clutch 422, a B1 brake 431, a B2 brake 432, and a B3 brake 433.

By engaging the frictional engagement elements of the automatic transmission 400 according to combinations shown in an operation table of FIG. 3, five forward gear stages of first to fifth gear stages are established in the power train. That is, in the power train, a speed ratio is changed according to the five forward gear stages.

In a state where the gear stage is established in the automatic transmission 400, the torque inputted to the automatic transmission 400 from the ring gear 328 of the power dividing mechanism 310 (the output torque of the hybrid system 100) is transmitted to the rear wheels 700 as drive wheels.

In the neutral state of the automatic transmission 400, all of the frictional engagement elements are brought into a disengaged state. In the neutral state, the transmission of the torque from the ring gear 328 of the power dividing mechanism 310 to the rear wheels 700 is interrupted.

The frictional engagement elements engaged when the fourth gear stage is established are the same as the frictional engagement elements engaged when the fifth gear stage is established. That is, the speed ratio in the automatic transmission 400 at the fourth gear stage is the same as that at the fifth gear stage. However, the speed ratios in the power dividing mechanism 310 are different.

When the fourth gear stage is established, the rotation of the first motor generator 311 is allowed in the power dividing mechanism 310, the engine speed is made equal to the rotating speed of the output shaft 304, and the speed ratio becomes "1". On the other hand, when the fifth gear stage is established, by setting the rotating speed of the first motor generator 311 to "0", the rotating speed of the output shaft 304 is made larger than the engine speed, and the speed ratio is made smaller than "1".

Figure 4:
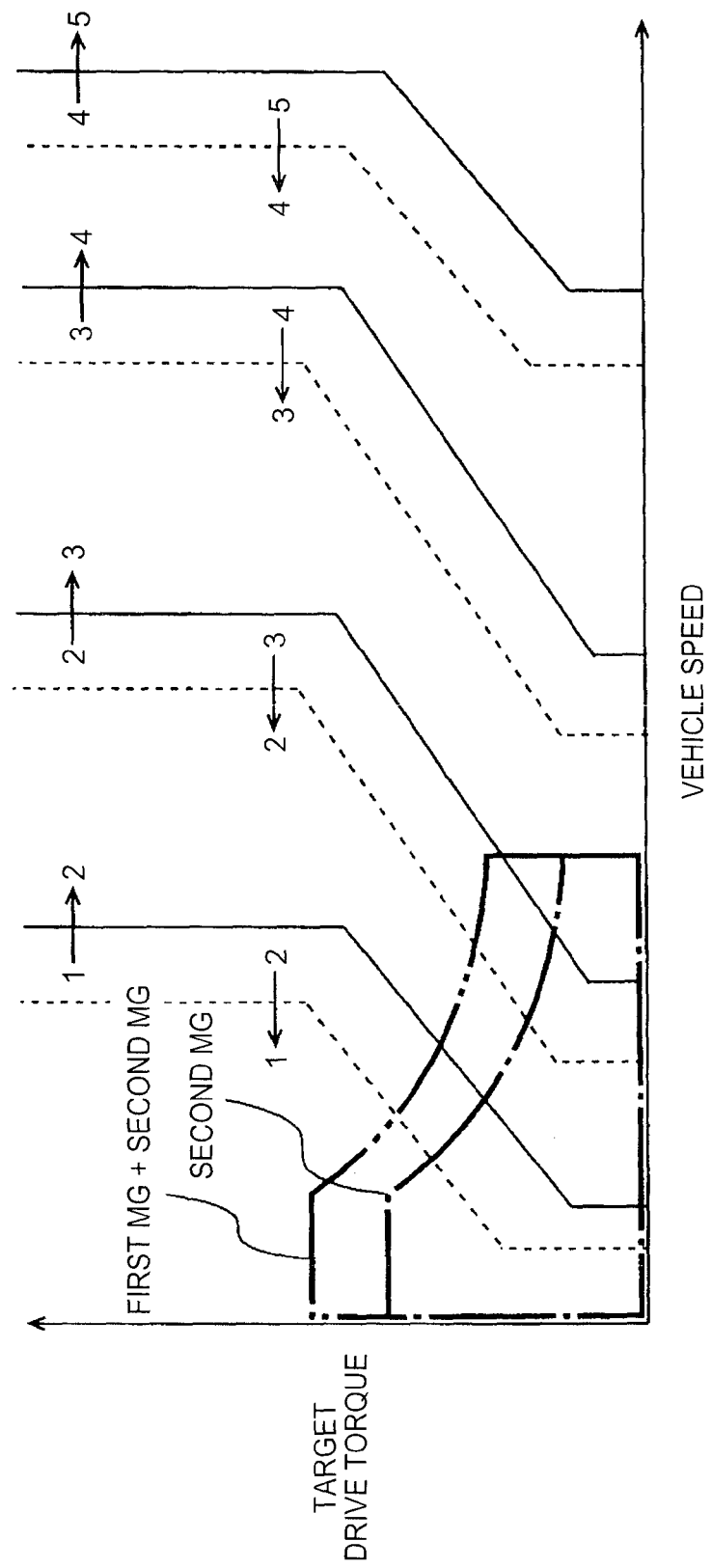
FIG. 4 is a view showing a gear shift diagram.

The gear shift in the power train is controlled based on, e.g., a gear shift diagram shown in FIG. 4. The gear shift diagram in the present embodiment is determined by using the target drive torque calculated from the accelerator depression amount, the vehicle speed and the like, and, the vehicle speed as parameters. Note that the parameters of the gear, shift diagram are not limited thereto.

Each of solid lines in FIG. 4 corresponds to an upshift line, while each of broken lines corresponds to a downshift line. An area surrounded by a one-dot chain line in FIG. 4 indicates an area where traveling is performed by using only the driving force of the second motor generator 312 without using the driving force of the engine 200. An area surrounded by the one-dot chain line and a two-dot chain line in FIG. 4 indicates an area where each of the rotating speed of the carrier 326 and the rotating speed of the output shaft of the engine 200 is reduced to zero by engaging the brake 330, and the traveling is performed by using the driving force of the first motor generator 311 and the driving force of the second motor generator 312.

An area outside the two-dot line indicates an area where the brake 330 is disengaged and the traveling is performed by using only the engine 200 as the drive source or using the engine 200 and the second motor generator 312 as the drive sources.

Figure 5:
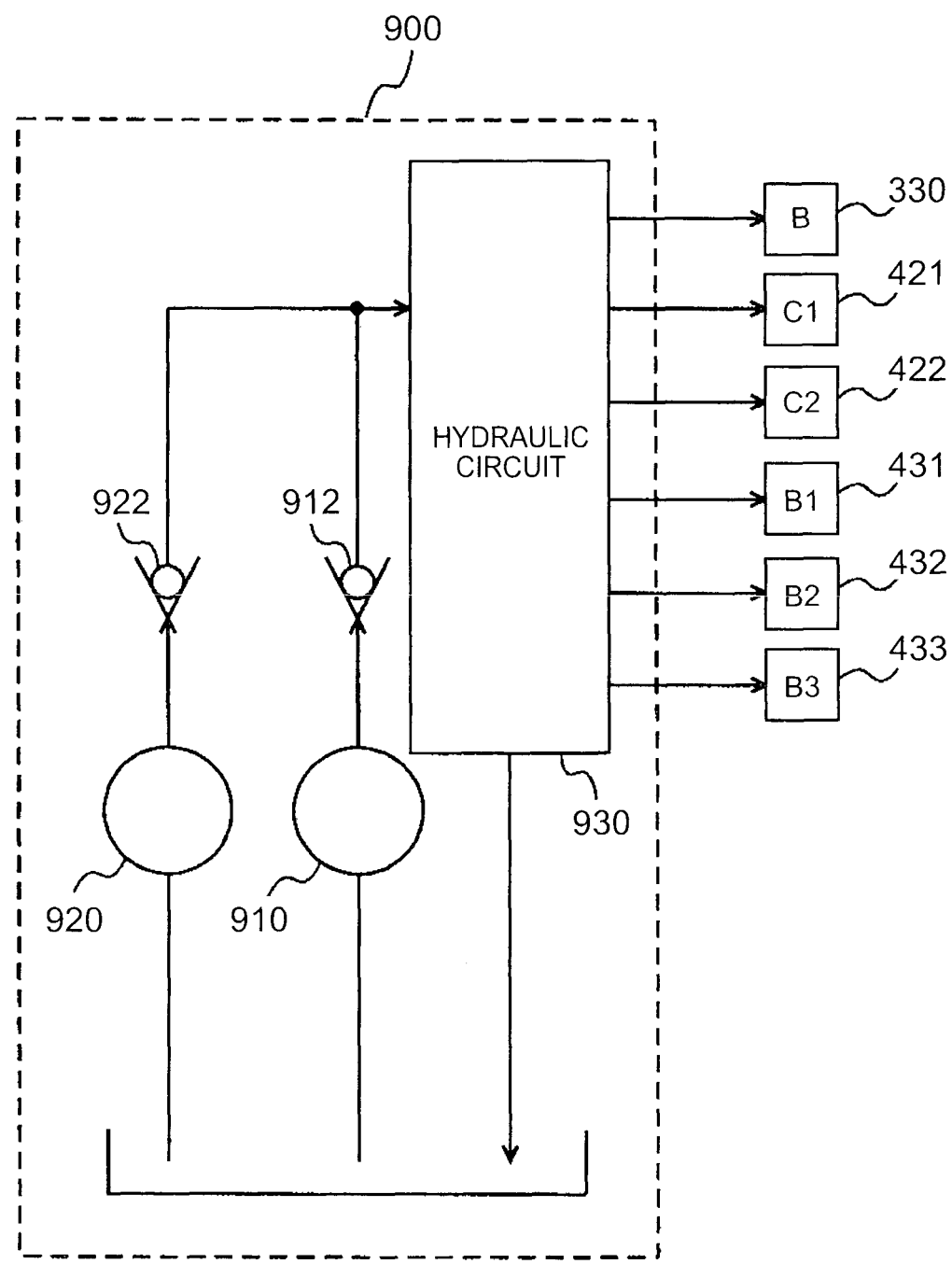
FIG. 5 is a view showing a hydraulic control device.

When the gear shift is performed, the C1 clutch 421, the C2 clutch 422, the B1 brake 431, the B2 brake 432, and the B3 brake 433 are caused to operate by the oil pressure. In the present embodiment, as shown in FIG. 5, the hybrid vehicle is provided with a hydraulic control device 900 that supplies the oil pressure to the individual frictional engagement elements to perform the control of engagement/disengagement thereof.

The hydraulic control device 900 includes a mechanical oil pump 910, an electric oil pump 920, and a hydraulic circuit 930 that adjusts the oil pressure generated by each of the oil pumps 910 and 920 into a line pressure, supplies the oil pressure prepared by using the line pressure as a source pressure to the individual frictional engagement elements, and supplies an oil for lubrication to appropriate portions.

The mechanical oil pump 910 is driven by the engine 200 to generate the oil pressure. The mechanical oil pump 910 is disposed coaxially with the carrier 326, and is caused to operate by the torque received from the engine 200. That is, the mechanical oil pump 910 is driven by the rotation of the carrier 326, and the oil pressure is thereby generated.

In contrast to this, the electric oil pump 920 is driven by a motor (not shown). The electric oil pump 920 is attached to an appropriate portion, such as the outside of a transmission case or the like. The electric oil pump 920 is controlled by the ECU 800 so as to generate a desired oil pressure. For example, the rotating speed of the electric oil pump 920 is feedback-controlled.

The hydraulic circuit 930 includes a plurality of solenoid valves, switching valves, or pressure control valves (not shown), and is configured to be capable of electrically controlling the pressure adjustment and, the supply of the oil pressure. The control thereof is performed by the ECU 800.

Note that the discharge sides of the oil pumps 910 and 920 are provided with check valves 912 and 922 that are opened with the discharge pressures of the oil pumps 910 and 920 and are closed with pressures opposite in direction to the discharge pressures, and the oil pumps 910 and 920 are connected to the hydraulic circuit 930 in parallel with each other. In addition, a valve that adjusts the line pressure (not shown) is configured to control the line pressure such that the line pressure is increased by increasing the discharge amount or reduced by reducing the discharge amount.

Figure 6:
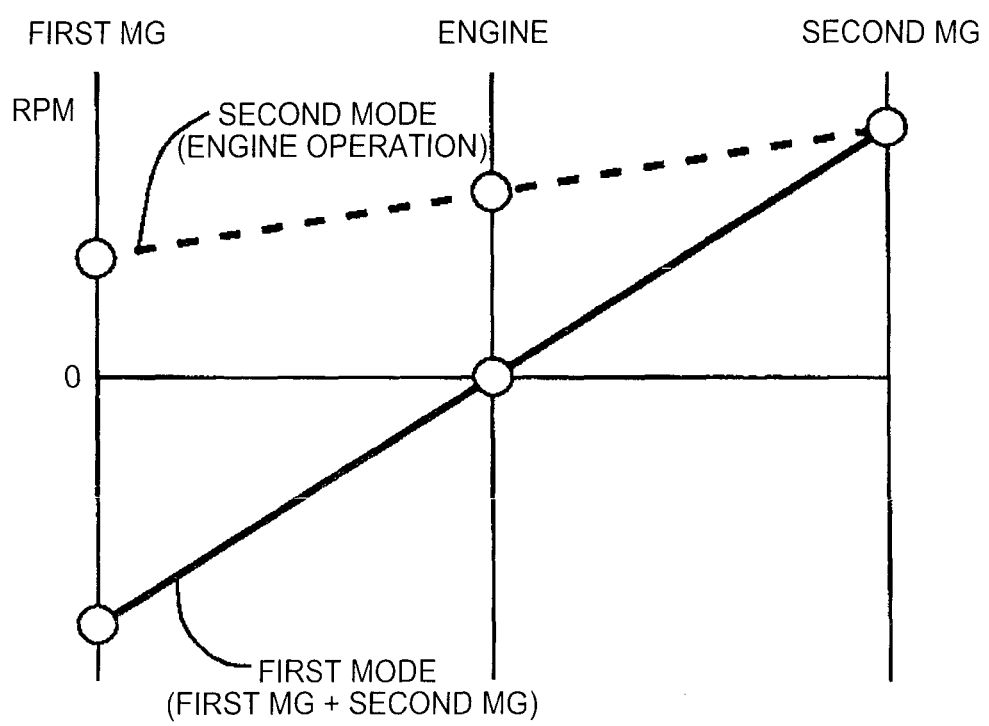
FIG. 6 is a view showing the rotating speed of each of an engine, a first motor generator, and a second motor generator.

As described above, in the present embodiment, the hybrid vehicle has a first mode in which each of the rotating speed of the carrier 326 and the rotating speed of the output shaft of the engine 200 is reduced to zero by engaging the brake 330 as indicated by the solid line in the diagram of FIG. 6, and the traveling is performed by using the driving force of the first motor generator 311 and the driving force of the second motor generator 312.

In addition, in a case where the remaining capacity of the battery is lowered or the like, in order to use the first motor generator 311 as a generator, the hybrid vehicle has a second mode in which the traveling is performed by operating the engine 200 as indicated by the broken line in the diagram of FIG. 6.

When the engine 200 is started, the engine 200 is cranked by the first motor generator 311. After the engine 200 is started, the first motor generator 311 is driven by the engine 200 and operates as the generator.

When the traveling mode is switched from the first mode to the second mode, the direction of output of the torque by the first motor generator 311 is reversed and the torque outputted from the first motor generator 311 is used for cranking the engine 200, and hence the drive torque of the entire vehicle can be inevitably reduced.

In the present embodiment, in order to suppress the reduction in the drive torque of the vehicle, the traveling mode is switched to the second mode after downshifting the automatic transmission 400.

Figure 7:
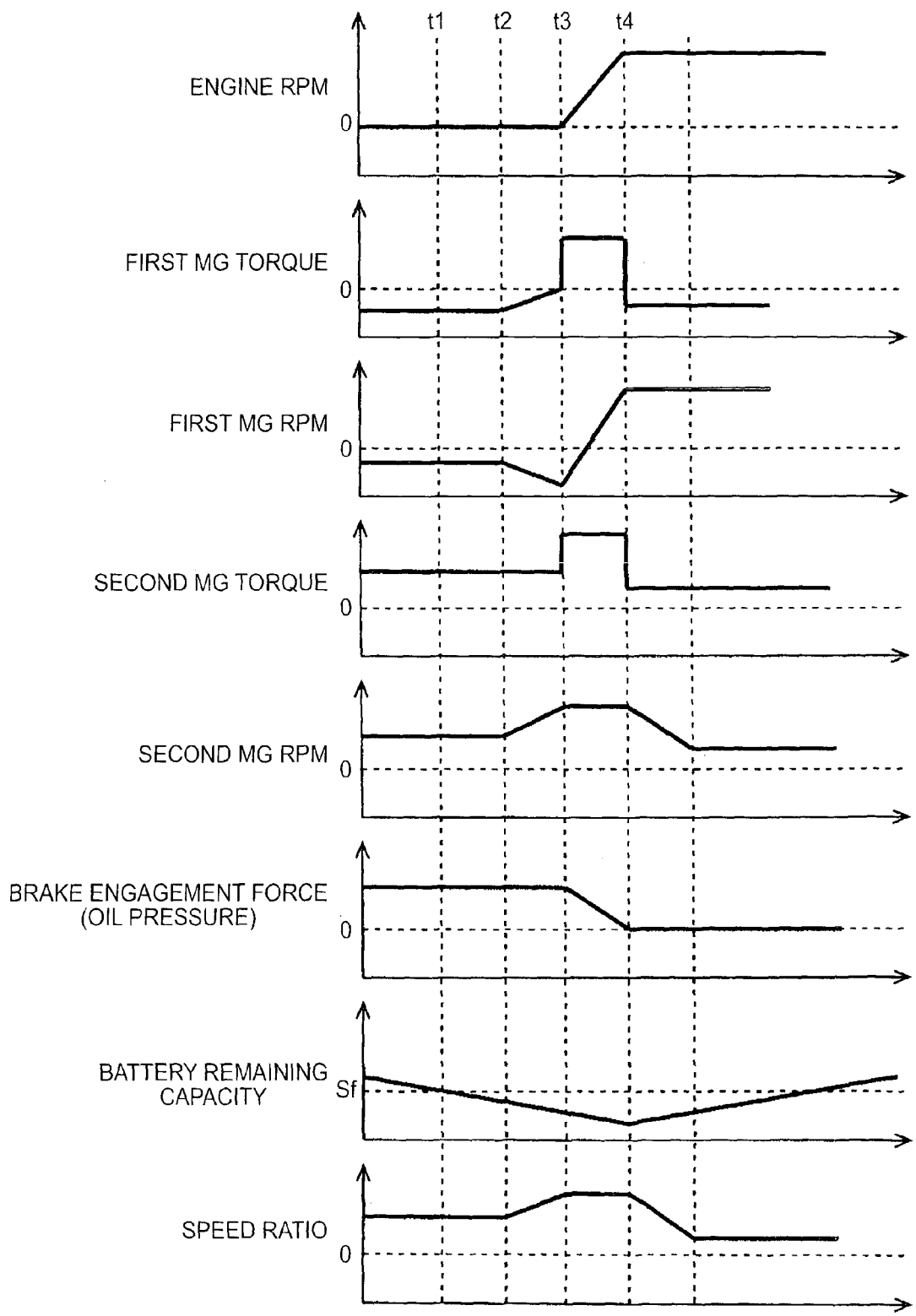
FIG. 7 is a timing chart when a traveling mode is switched from a first mode to a second mode after downshift.

For example, when the remaining capacity of the battery becomes smaller than a threshold value Sf at a time t1 shown in FIG. 7, the downshift is started at a time t2, and the reduction in the absolute value of the output torque of the first motor generator 311 is started. During the downshift, the engagement force (oil pressure) of the brake 330 is maintained constant. Accordingly, by maintaining the brake 330 in the engaged state, the rotating speed of the output shaft of the engine 200 is maintained at zero.

After the downshift is completed at a time t3, the disengagement of the brake 330 and the cranking of the engine 200 are started, and the engine 200 is started. While the brake 330 is switched from the engaged state to the disengaged state, the speed ratio of the automatic transmission 400 is kept unchanged.

After the engine 200 is started at a time t4 and the traveling mode is switched to the second mode, the automatic transmission 400 is upshifted.

Figure 8:
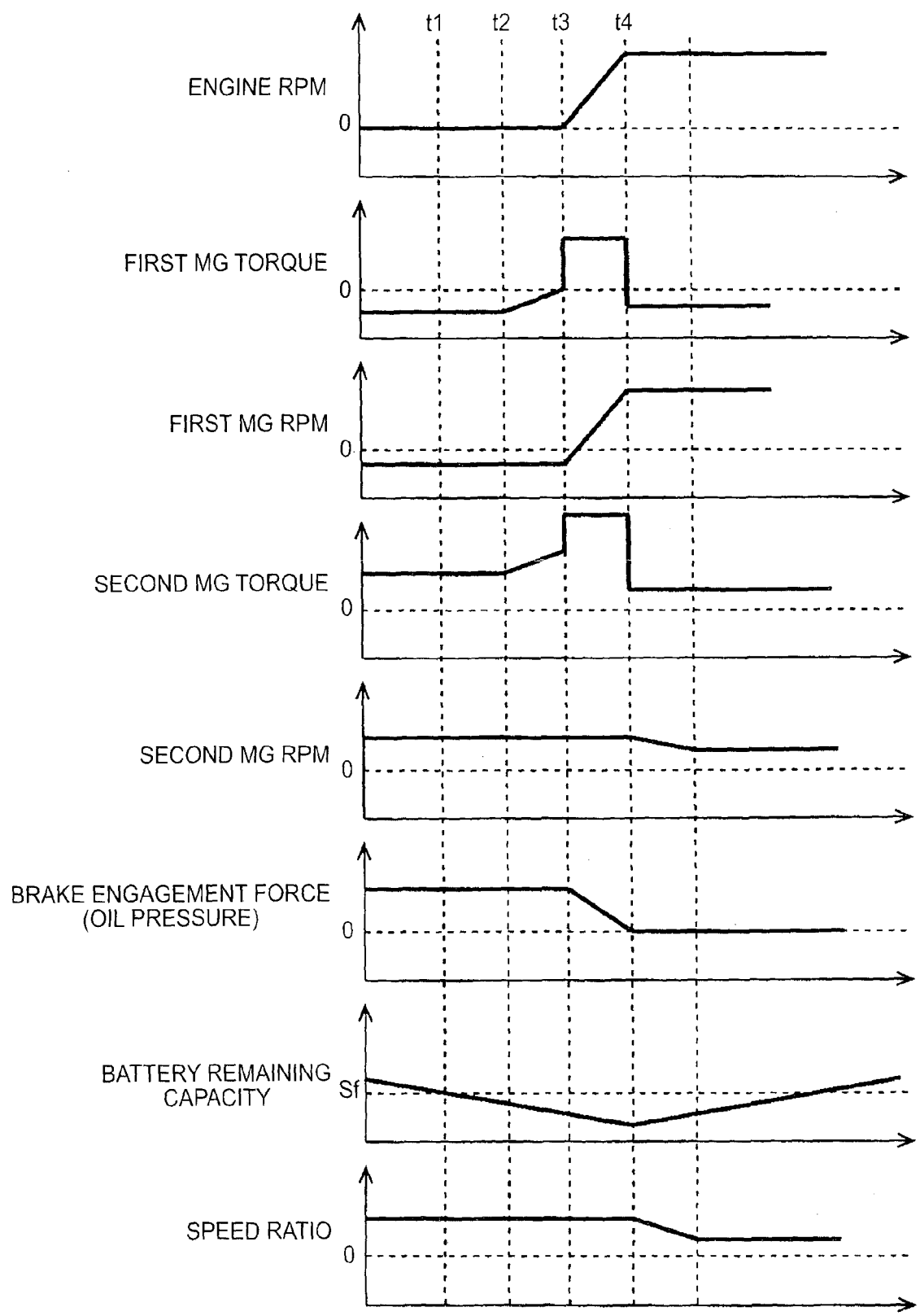
FIG. 8 is a timing chart when the traveling mode is switched from the first mode to the second mode without the downshift.

However, in a case where the target drive torque of the vehicle can be achieved only with the torque outputted from the second motor generator 312, as shown in FIG. 8, the traveling mode is switched to the second mode without downshifting the automatic transmission 400.

The target drive torque of the vehicle is determined according to a map having, e.g., the accelerator depression amount and the vehicle speed as parameters. The torque that can be outputted from the second motor generator 312 is determined according to a map having, e.g., the rotating speed of the second motor generator 312 as the parameter.

A process executed by the ECU 800 will be described with reference to FIG. 9. When the traveling mode is the first mode, in step (hereinafter abbreviated as S) 100, it is determined whether or not the remaining capacity of the battery is smaller than the predetermined threshold value Sf. When the remaining capacity of the battery is not smaller than the threshold value Sf (NO in S100), the first mode is continued in S102.

When the remaining capacity of the battery is smaller than the predetermined threshold value Sf (YES in S100), in S104, it is determined whether or not the target drive torque of the vehicle can be achieved only with the torque outputted from the second motor generator 312. As an example, when the drive torque calculated by multiplying the maximum torque determined from the RPM of the second motor generator 312 by the current speed ratio of the automatic transmission 400, the final speed ratio thereof, or the like is not less than the target drive torque determined from the accelerator depression amount, the vehicle speed and the like, it is determined that the target drive torque of the vehicle can be achieved only with the torque outputted from the second motor generator 312.

In a case where the target drive torque of the vehicle can be achieved only with the torque outputted from the second motor generator 312 (YES in S104), the traveling mode is switched to the second mode without downshifting the automatic transmission 400.

Specifically, in S110, the absolute value of the output torque of the first motor generator 311 is reduced, and the absolute value of the output torque of the second motor generator 312 is increased. Thereafter, the brake 330 is disengaged in S112, and the engine 200 is started by cranking the engine 200 using the first motor generator 311 in S114. After the engine 200 is started, the speed ratio of the automatic, transmission 400 is changed such that the desired speed ratio can be obtained in S116.

On the other hand, in a case where the target drive torque of the vehicle cannot be achieved only with the torque outputted from the second motor generator 312 (NO in S104), the traveling mode is switched to the second mode after downshifting the automatic transmission 400.

Specifically, in S120, the automatic transmission 400 is downshifted. Further, in S 122, the absolute value of the output torque of the first motor generator 311 is reduced. Thereafter, in S124, the brake 330 is disengaged, and the engine 200 is started by cranking the engine 200 using the first motor generator 311 in S126.

It should be understood that the embodiment disclosed herein is considered to be illustrative and non-restrictive in every aspect. The scope of the invention is defined by the terms of the claims rather than the description above, and is intended to include any modifications within the scope and meaning equivalent to the terms of the claims.

The invention claimed is:

1. A control device for a vehicle on which a differential device including a first rotary element, a second rotary element, and a third rotary element, a first electric motor coupled to the first rotary element, a second electric motor coupled to the second rotary element, a transmission provided between the second rotary element and a drive wheel, an engine coupled to the third rotary element, and an engagement element suppressing rotation of the third rotary element are mounted, the control device comprising:

an electronic control unit configured to switch a traveling mode of the vehicle from a first mode in which the vehicle travels by using a torque outputted from the first electric motor and a torque outputted from the second electric motor in a state where the engagement element is engaged, to a second mode in which the vehicle travels by operating the engine in a state where the engagement element is disengaged, the electronic control unit being configured to switch the traveling mode to the second mode after downshifting the transmission, wherein the electronic control unit is configured to switch the traveling mode to the second mode without downshifting the transmission when a target drive torque of the vehicle is achievable only with the torque outputted from the second electric motor.

2. The control device according to claim 1, wherein the electronic control unit is configured to reduce the torque outputted from the first electric motor during the downshift.

3. The control device according to claim 1, wherein the electronic control unit is configured to maintain an engagement force of the engagement element constant during the downshift.

4. The control device according to claim 1, wherein the electronic control unit is configured to start the engine after the downshift is completed.

5. The control device according to claim 1, wherein the electronic control unit is configured to keep a speed ratio of the transmission unchanged while the engagement element is switched from the state where the engagement element is engaged to the state where the engagement element is disengaged.

6. The control device according to claim 1, wherein the electronic control unit is configured to upshift the transmission after switching the traveling mode to the second mode.

7. The control device according to claim 1, wherein the electronic control unit is configured to switch the traveling mode to the second mode after downshifting the transmission when a target drive torque of the vehicle cannot be achieved only with the torque outputted from the second electric motor.

* * * * *